United States Patent
Yilmaz et al.

(10) Patent No.: US 8,963,561 B2
(45) Date of Patent: Feb. 24, 2015

(54) RANDOMIZING ONE OR MORE MICRO-FEATURES OF A TOUCH SENSOR

(75) Inventors: Esat Yilmaz, Santa Cruz, CA (US); Carl Carley, Basingstoke (GB); Michael Thomas Morrione, San Jose, CA (US)

(73) Assignee: Atmel Corporation, San Jose, CA (US)

( * ) Notice: Subject to any disclaimer, the term of this patent is extended or adjusted under 35 U.S.C. 154(b) by 390 days.

(21) Appl. No.: 13/288,385

(22) Filed: Nov. 3, 2011

(65) Prior Publication Data
US 2013/0113502 A1 May 9, 2013

(51) Int. Cl.
*G01R 27/28* (2006.01)
*G06F 3/044* (2006.01)

(52) U.S. Cl.
CPC ...... *G06F 3/044* (2013.01); *G06F 2203/04112* (2013.01)
USPC .......................................... 324/649; 345/173

(58) Field of Classification Search
USPC ............................ 324/650–690; 345/173–178
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 * | 10/2011 | Hotelling et al. | 345/173 |
| 8,049,732 B2 | 11/2011 | Hotelling | |
| 8,179,381 B2 | 5/2012 | Frey | |
| 8,179,384 B2 | 5/2012 | Sakashita | |
| 2002/0186210 A1 | 12/2002 | Itoh | |
| 2005/0253816 A1* | 11/2005 | Himberg et al. | 345/173 |
| 2006/0097991 A1* | 5/2006 | Hotelling et al. | 345/173 |
| 2007/0081726 A1* | 4/2007 | Westerman et al. | 382/185 |
| 2008/0117186 A1 | 5/2008 | Wang | |
| 2009/0153502 A1 | 6/2009 | Jiang | |
| 2009/0184940 A1 | 7/2009 | Silk | |
| 2009/0219258 A1* | 9/2009 | Geaghan et al. | 345/173 |
| 2009/0273577 A1 | 11/2009 | Chen | |
| 2009/0315854 A1 | 12/2009 | Matsuo | |
| 2010/0026664 A1 | 2/2010 | Geaghan | |
| 2010/0028811 A1 | 2/2010 | Geaghan | |
| 2010/0045614 A1 | 2/2010 | Gray | |

(Continued)

FOREIGN PATENT DOCUMENTS

JP 2008-145998 6/2008
WO WO 2012/129247 9/2012

OTHER PUBLICATIONS

Office Action for U.S. Appl. No. 12/608,779, Jan. 3, 2012.
(Continued)

*Primary Examiner* — Arleen M Vazquez
*Assistant Examiner* — Brent J Andrews
(74) *Attorney, Agent, or Firm* — Baker Botts LLP

(57) ABSTRACT

In one embodiment, an apparatus includes a touch sensor with one or more meshes of conductive material. Each of the meshes includes multiple mesh cells defined by multiple mesh segments. Each of the mesh cells includes a centroid and multiple vertices. The mesh segments are made of the conductive material, and the centroids or vertices of the mesh cells have a substantially random distribution within an area of the touch sensor. The apparatus also includes one or more computer-readable non-transitory storage media coupled to the touch sensor that embody logic that is configured when executed to control the touch sensor.

18 Claims, 12 Drawing Sheets

(56) References Cited

U.S. PATENT DOCUMENTS

| | | |
|---|---|---|
| 2010/0079387 A1 | 4/2010 | Rosenblatt |
| 2010/0328228 A1* | 12/2010 | Elias .............................. 345/173 |
| 2011/0032193 A1 | 2/2011 | Szalkowski |
| 2011/0102361 A1 | 5/2011 | Philipp |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.
U.S. Appl. No. 13/312,702, filed Dec. 6, 2011, Philipp.
Office Action for U.S. Appl. No. 13/312,702, Mar. 16, 2012.
U.S. Appl. No. 13/408,762, filed Feb. 29, 2012, Philipp.
Office Action for U.S. Appl. No. 13/408,762, May 9, 2012.
Office Action for U.S. Appl. No. 13/408,762, Sep. 7, 2012.
Office Action for U.S. Appl. No. 12/608,779, Sep. 27, 2012.
"Conductive Inkjet Technology," [online]. [retrieved Apr. 20, 2010]. Retrieved from the Internet: <URL: http://www.conductiveinkjet.com/about-us/latest-news/2009.aspx>, 2009.
Cambrios Technologies Corporation Awarded Department of Defense Contract for Flexible Solar Cells, [online]. [retrieved Apr. 20, 2010]. Retrieved from the Internet: <URL: <http://www.cambrios.com/200/DOD Release.htm>, Apr. 12, 2010.
"New Silver Conductive Inks Target High-Growth Touch Screen and OLED Markets", [online]. [retrieved Apr. 20, 2010]. Retrieved from the Interent: <URL: http://www2.dupont.com/MCM/en_US/news_events/article201 00413.html>, Apr. 13, 2010.
"Printing of Antennas and Flexible Circuits", Core Applications & Technologies, Conductive Inkiet Technology Ltd., Oct. 2009.
Horteis, M., et al., "Fine Line Printed and Plated Contacts on High OHMIC Emitters Enabling 20% Cell Efficiency", *34th IEEE Photovoltaic Specialists Conference(PVSC)*, 2009.

\* cited by examiner

US 8,963,561 B2

RANDOMIZING ONE OR MORE MICRO-FEATURES OF A TOUCH SENSOR

TECHNICAL FIELD

This disclosure generally relates to touch sensors.

BACKGROUND

A touch position sensor may detect the presence and location of a touch or the proximity of an object (such as a user's finger or a stylus) within a touch-sensitive area of the touch sensor overlaid on a display screen, for example. In a touch sensitive display application, the touch position sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch position sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
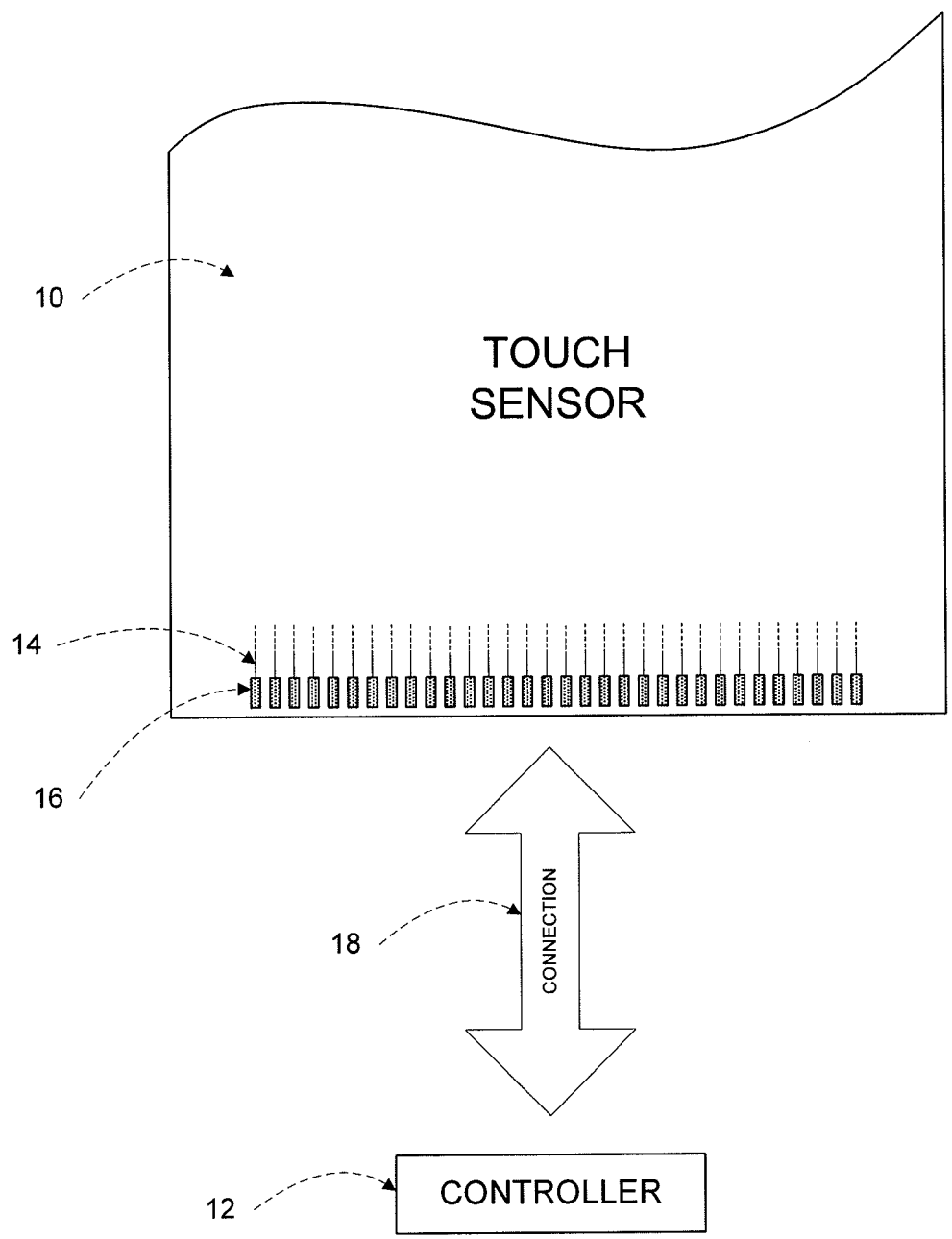
FIG. 1 illustrates an example touch sensor with an example controller.

FIG. 1 illustrates an example touch sensor 10 with an example controller 12. Herein, reference to a touch sensor may encompass a touch screen, and vice versa, where appropriate. Touch sensor 10 and controller 12 may detect the presence and location of a touch or the proximity of an object within a touch-sensitive area of touch sensor 10. Herein, reference to a touch sensor may encompass both the touch sensor and its controller, where appropriate. Similarly, reference to a controller may encompass both the controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a drive electrode or a sense electrode) may be an area of conductive material forming a shape, such as for example a disc, square, rectangle, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy approximately 5% of the area of its shape. As an example and not by way of limitation, an electrode may be made of fine lines of metal or other conductive material (such as for example copper, silver, or a copper- or silver-based material) and the fine lines of conductive material may occupy approximately 5% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and controller 12 may measure the change in capacitance. By measuring changes in capacitance throughout the array, controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 may detect and process the change in capacitance to determine the presence and location of the touch or proximity input. Controller 12 may then communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

Controller 12 may be one or more integrated circuits (ICs)—such as for example general-purpose microprocessors, microcontrollers, programmable logic devices or arrays, application-specific ICs (ASICs)—on a flexible printed circuit (FPC) bonded to the substrate of touch sensor 10, as described below. Controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 may couple the drive or sense electrodes of touch sensor 10 to bond pads 16, also disposed on the substrate of touch sensor 10. As described below, bond pads 16 facilitate coupling of tracks 14 to controller 12. Tracks 14 may extend into or around (e.g. at the edges of) the touch-sensitive area(s) of touch sensor 10. Particular tracks 14 may provide drive connections for coupling controller 12 to drive electrodes of touch sensor 10, through which the drive unit of controller 12 may supply drive signals to the drive electrodes. Other tracks 14 may provide sense connections for coupling controller 12 to sense electrodes of touch sensor 10, through which the sense unit of controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a bond pad 16) at an edge of the substrate of touch sensor 10 (similar to tracks 14).

Bond pads 16 may be located along one or more edges of the substrate, outside the touch-sensitive area(s) of touch sensor 10. As described above, controller 12 may be on an FPC. Bond pads 16 may be made of the same material as tracks 14 and may be bonded to the FPC using an anisotropic conductive film (ACF). Connection 18 may include conductive lines on the FPC coupling controller 12 to bond pads 16, in turn coupling controller 12 to tracks 14 and to the drive or sense electrodes of touch sensor 10. This disclosure contemplates any suitable connection 18 between controller 12 and touch sensor 10.

As described above, a touch sensor may include conductive material forming an array of drive or sense electrodes. The conductive material may be disposed on one or more substrates that may overlie a display of a device including the touch sensor. A user may see one or more images on the display through the conductive material and the substrate(s) of the touch sensor. One or more micro-features of the touch sensor may affect its optical characteristics. As an example and not by way of limitation, one or more micro-features of the touch sensor may optically interfere with the display of one or more images by a display (such as for example a liquid crystal display (LCD)) underneath and visible through the touch sensor. Repeating patterns in the micro-features of the touch sensor may optically interfere with repeating pixel patterns of or repeating patterns in an image on the display, resulting in one or more moiré patterns that may be substantially visible to a user and distort or reduce the clarity of the display as seen through the touch sensor by the user. The moiré patterns may appear to the user as angled, wavy, zig-zag, or other patterns.

Particular embodiments may reduce optical interference by a touch sensor with a display visible through it. As an example and not by way of limitation, particular embodiments may provide substantially randomized touch-sensor micro-features that reduce or eliminate repeating patterns or frequencies in conductive material of a touch sensor, which may in turn reduce or eliminate optical interference (such as the occurrence of one or more moiré patterns) with a display visible though the touch sensor. Particular embodiments provide substantially randomized touch-sensor micro-features that do not substantially repeat with respect to any orientation of a touch sensor (such as horizontal, vertical, or angled). Particular embodiments substantially randomize one or more micro-features of a mesh of conductive material providing drive or sense electrodes (or other elements) of a touch sensor, which may reduce or eliminate the occurrence of repeating patterns or frequencies in the mesh.

Figure 2:
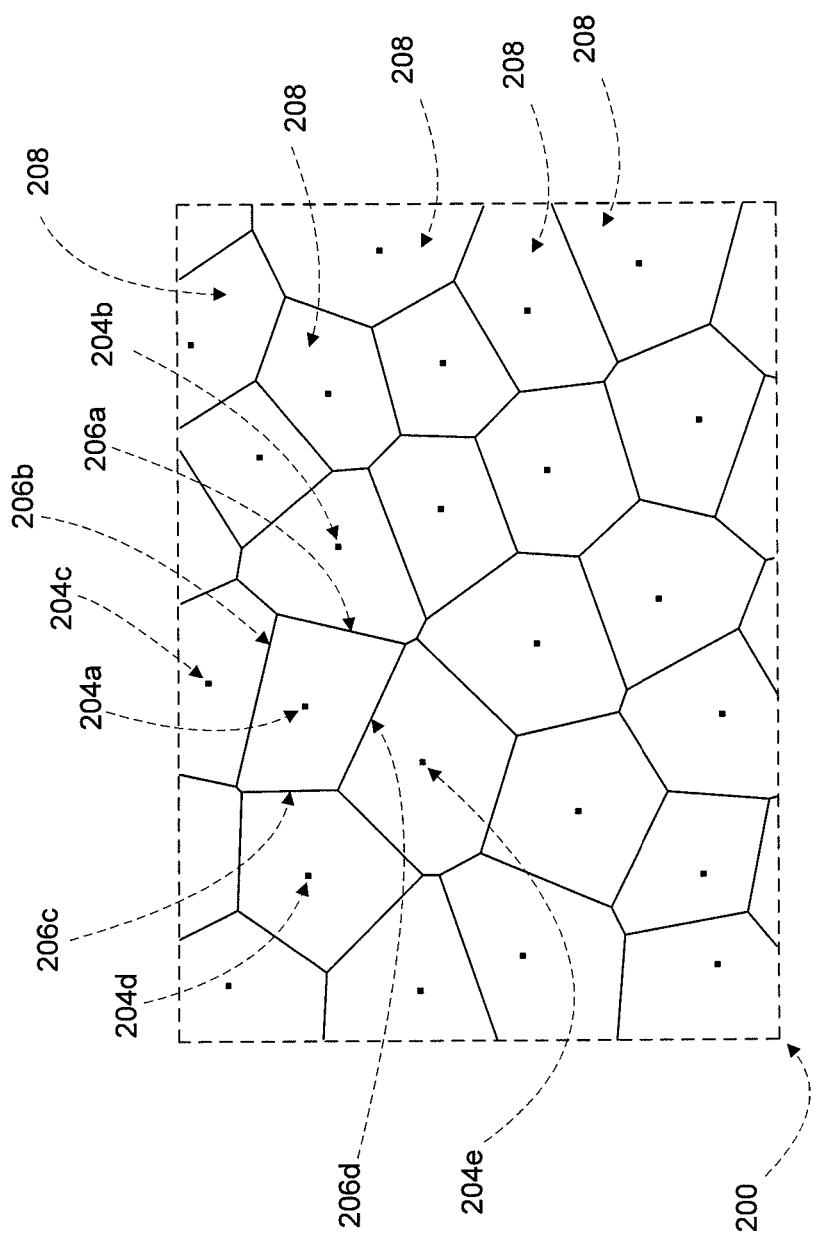
FIG. 2 illustrates example randomized micro-features of a touch sensor.

FIG. 2 illustrates example randomized micro-features of a touch sensor. In the example of FIG. 2, area 200 substantially embodies a Voronoi diagram, with seeds 204 corresponding to Voronoi sites, mesh segments 206 corresponding to Voronoi segments, and mesh cells 208 corresponding to Voronoi cells. Every point along each mesh segment 206 may be substantially equidistant from its two closest seeds 204. As an example and not by way of limitation, each point along mesh segment 206a may be substantially equidistant from seeds 204a and 204b; each point along mesh segment 206b may be substantially equidistant from seeds 204a and 204c; each point along mesh segment 206c may be substantially equidistant from seeds 204a and 204d; each point along mesh segment 206d may be substantially equidistant from seeds 204a and 204e; and so on. Although this disclosure describes and illustrates a particular area 200 with particular seeds 204 in particular locations, this disclosure contemplates any suitable area 200 with any suitable seeds 204 in any suitable locations. Moreover, although this disclosure describes and illustrates particular mesh segments 206 defining particular mesh cells 208 in particular configurations, this disclosure contemplates any suitable mesh segments 206 defining any suitable mesh cells 208 in any suitable configurations.

Area 200 may correspond to a portion of a drive or sense electrode (or other element) of a touch sensor. Other portions of the drive or sense electrode or other element of the touch sensor—or other portions of other drive or sense electrodes or other elements of the touch sensor—may similarly embody Voronoi diagrams. In a touch sensor, mesh segments 206 may correspond to fine lines of metal (such as for example copper, silver, or a copper- or silver-based material) or other conductive material with a thickness of approximately 5 μm or less and a width of approximately 10 μm or less. Seeds 204, on the other hand, do not correspond to any conductive or other material in the touch sensor. Instead, they help determine the arrangement of mesh segments 206, as described below with reference to FIG. 4. Mesh segments 206 are arranged in a substantially randomized geometry that may reduce the occurrence of repeating patterns or frequencies among mesh segments 206, which may in turn reduce the occurrence of moiré patterns with respect to a display visible through area 200.

Figure 3:
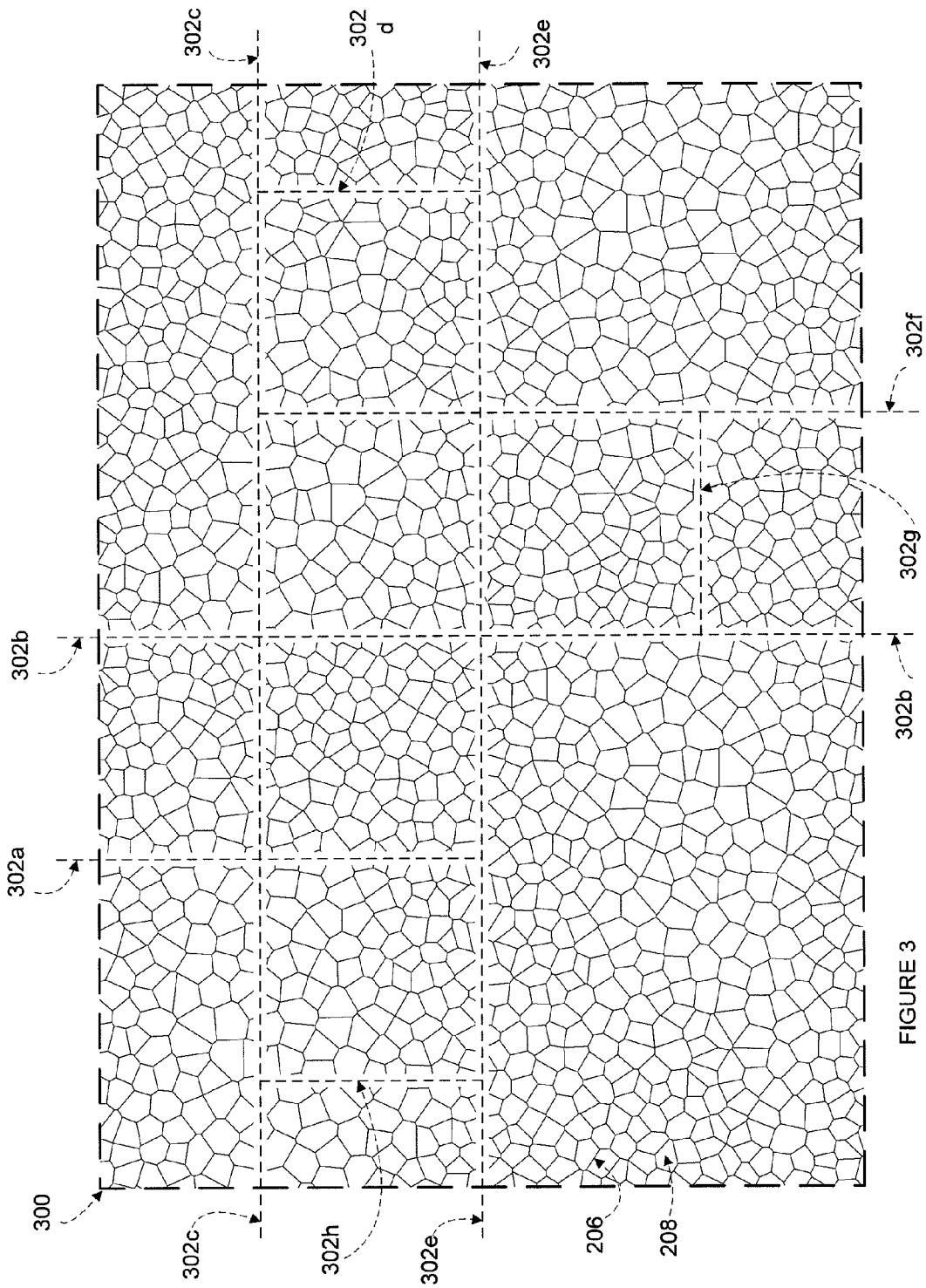
FIG. 3 illustrates example macro-features of a touch sensor made from randomized micro-features similar to those of FIG. 2.

FIG. 3 illustrates example macro-features of a touch sensor made from randomized micro-features similar to those of FIG. 2. The example of FIG. 3 is a single-sided implementation, but this disclosure contemplates any suitable n-sided implementation and is not limited to a singled-sided implementation. Similar to area 200, area 300 substantially embodies a Voronoi diagram, with mesh segments 206 and mesh cells 208 corresponding to Voronoi segments and Voronoi cells. In the example of FIG. 3, cuts 302 have been applied to mesh segments 206 to form macro-features of a touch sensor. As examples and not by way of limitation, (1) the region of area 300 bounded at least in part by cuts 302a and 302c may correspond to a portion of a drive electrode; (2) the region bounded at least in part by cuts 302b and 302c may correspond to another portion of the same (or a portion of another) drive electrode; (3) the region bounded by cuts 302e and 302f may correspond to a portion of a sense electrode; and (4) the region bounded by cuts 302b and 302e may correspond to a portion of another (or another portion of the same) sense electrode.

The following regions may each be an in-fill element of the touch sensor: (1) the region bounded at least in part by cuts 302a, 302b, and 302c; (2) the region bounded at least in part by cuts 302c, 302e, and 302h; (3) the region bounded by cuts 302a, 302c, 302e, and 302h; (4) the region bounded by cuts 302a, 302b, 302c, and 302e; (5) the region bounded by cuts 302b, 302c, 302e, and 302f; (6) the region bounded by cuts 302c, 302d, 302e, and 302f; (7) the region bounded at least in part by cuts 302c, 302d, and 302e; (8) the region bounded by cuts 302b, 302e, 302f, and 302g; and (9) the region bounded at least in part by cuts 302b, 302f, and 302g. Particular embodiments may use in-fill elements to substantially fill what would otherwise be substantial gaps or voids separating drive or sense electrodes or other conducting elements of a touch sensor. An in-fill element may be electrically isolated from all neighboring elements (including other in-fill elements and drive and sense electrodes). The use of in-fill elements in a touch sensor may help to visually obscure one or more patterns of drive or sense electrodes or other conducting elements in the touch sensor, while having a minimal impact on the fringing electrical fields between adjacent drive or sense electrodes or other conducting elements. Filling what would otherwise be a one or more substantial gaps or voids separating drive or sense electrodes or other conducting elements of a touch sensor with one or more in-fill elements may reduce optical discontinuities visible when viewing a display through the touch sensor. Although this disclosure describes and illustrates particular elements of a particular touch sensor with particular shapes arranged in a particular pattern, this disclosure contemplates any suitable elements of any suitable touch sensors with any suitable shapes arranged in any suitable patterns.

Cuts 302 may be made in any suitable manner. As an example and not by way of limitation, particular embodiments may use a mask defining cuts 302 in the process of manufacturing touch sensors with macro-features formed by cuts 302. As another example, the mesh may be designed to include discontinuities in the mesh corresponding to cuts 302.

Figure 4:
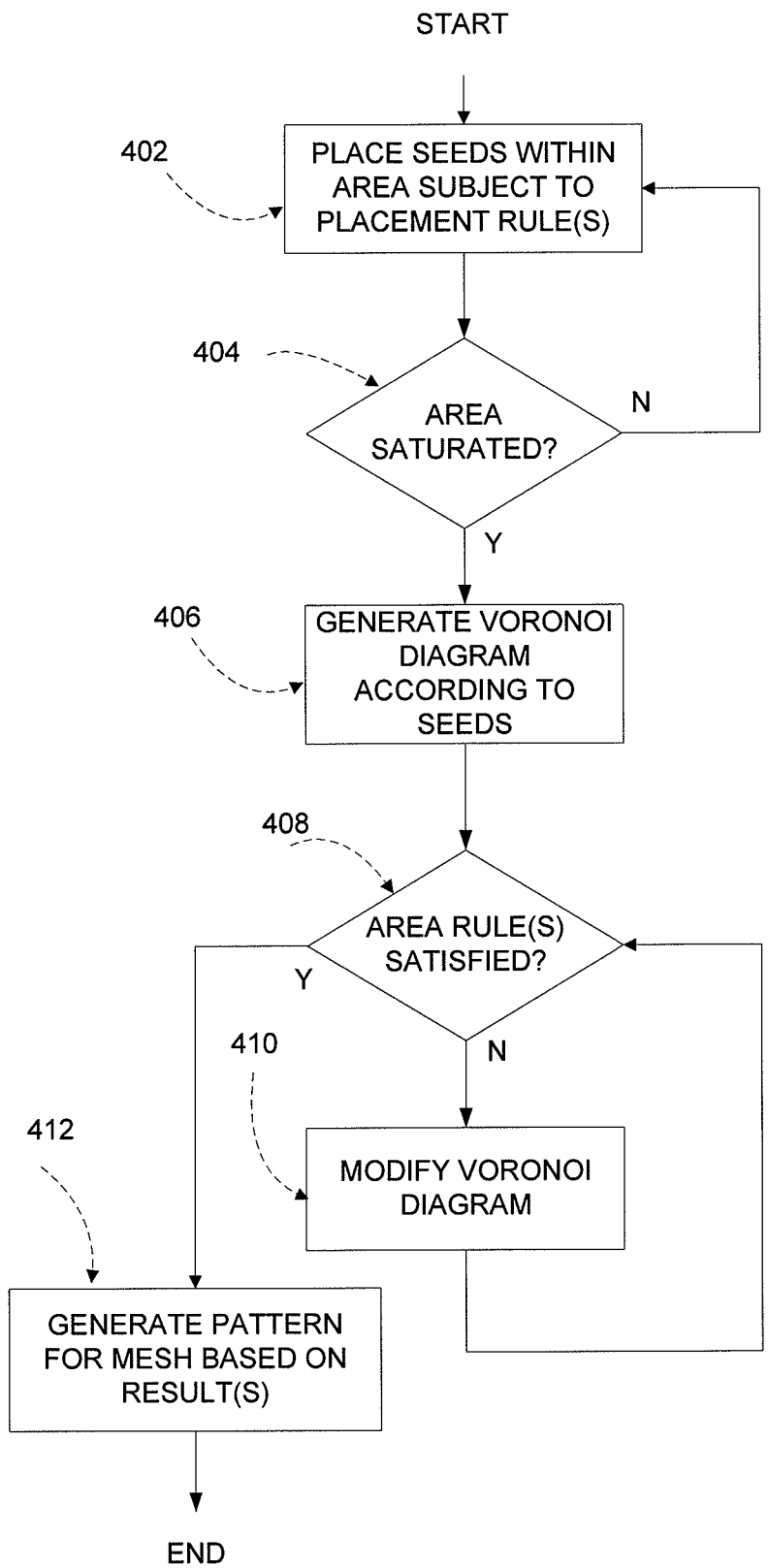
FIG. 4 illustrates an example method for randomizing one or more micro-features of a touch sensor.

FIG. 4 illustrates an example method for randomizing one or more micro-features of a touch sensor. The method may begin at step 402, where seeds 204 are placed within an area subject to one or more placement rules. The area may be a physical area. In addition or as an alternative, the area may be a design area corresponding to an area of a template used to manufacture one or more portions of a touch sensor. In addition or as an alternative, the area may be a digital representation of an area. For each seed 204, a location is selected and, if placement of seed 204 at that location would satisfy all applicable placement rules, seed 204 may be placed at that location. If placement of seed 204 at that location would violate one or more applicable placement rules, a new location may be selected for seed 204. Seed 204 may be placed at the new location if placement of seed 204 at the new location would satisfy all applicable placement rules. If placement of seed 204 at the new location would violate one or more placement rules, another new location may be selected for seed 204. This process may continue until a suitable location is found for seed 204.

Locations for seeds 204 may be selected substantially randomly within the area. As an example, locations for seeds 204 may be selected at random from a group of locations making up the area. Each location within the area may be represented by an entry of a matrix, an entry of the matrix may be chosen substantially at random, and (if placement of a seed 204 there would satisfy all applicable placement rules) a seed 204 may be placed at a location corresponding to that entry of the matrix. If placement of seed 204 at that location would violate one more applicable placement rules, then another entry of the matrix may be chosen substantially at random and (if placement of seed 204 there would satisfy all applicable placement rules) seed 204 may placed at a location corresponding to the other entry of the matrix. If placement of seed 204 at the location corresponding to the other entry of the matrix would violate one or more applicable placement rules, then yet another matrix entry may be chosen substantially at random. This process may continue until a suitable location is found for seed 204.

A placement rule may be any suitable constraint on the placement of one or more seeds 204 within an area. As an example, a placement rule may specify that every seed 204 must be at least a minimum distance away from every other seed 204. Although this disclosure describes particular placement rules, this disclosure contemplates any suitable placement rules.

Seeds 204 may continue to be placed within the area until the area is saturated with them. As an example and not by way of limitation, the area may be considered saturated with seeds 204 if a pre-determined number of unsuccessful attempts have been made to place a seed 204 at step 402. In addition or as an alternative, the area may be considered saturated with seeds 204 if a methodical sweep of the area reveals that no further seeds 204 can be placed without violating placement rules. Although this disclosure describes particular forms of saturation, this disclosure contemplates any suitable forms of saturation. At step 404, if the area is saturated, then the method proceeds to step 406. Otherwise, the method returns to step 402.

At step 406, a Voronoi diagram is generated according to seeds 204 placed within the area. Seeds 204 may correspond to Voronoi sites, and mesh segments 206 may correspond to Voronoi segments. Every point along each mesh segment 206 may be substantially equidistant from its two closest seeds

204. FIGS. 2 and 3 illustrate examples portions of example Voronoi diagrams generated in the method of FIG. 4.

At step 408, if the Voronoi diagram violates one or more applicable area rules, then the method proceeds to step 410. If the Voronoi diagram satisfies all applicable area rules, then the method proceeds to step 412. An area rule may be any suitable constraint on the areas or other suitable aspects of mesh cells 208 formed by mesh segments 206. As an example and not by way of limitation, an area rule may specify that the area of each mesh cell 208 must be above a lower threshold and below an upper threshold. As another example, an area rule may specify that the range of areas (e.g. the area of a largest one of mesh cells 208 minus the area of a smallest one of mesh cells 208) must be below a threshold value. As another example, an area rule may specify that a length-to-width ratio of each mesh cell 208 must be within a range of pre-determined values. Although this disclosure describes particular area rules, this disclosure contemplates any suitable area rules.

At step 410, the Voronoi diagram is modified. The Voronoi diagram may be modified in any suitable manner. As an example and not by way of limitation, one or more seeds 204 or mesh segments 206 may be added, removed, or relocated. One or more mesh segments 206 of the Voronoi diagram may be added, removed, or relocated in response to one or more seeds 204 being added, removed, or relocated. Modification of the Voronoi diagram may continue until all applicable area rules are satisfied.

At step 412, a mesh pattern is generated based on the Voronoi diagram (as modified where appropriate), at which point the method may end. This disclosure contemplates the mesh pattern being generated in any suitable manner. In particular embodiments, the mesh pattern generated based on the Voronoi diagram may encompass an interior portion of the Voronoi diagram that excludes edge portions of the Voronoi diagram. This may mitigate the effects of edge conditions of the mesh pattern that may result in one or more violations of one or more placement or area rules. Cuts 302 may be made to the mesh pattern to form various macro-features of a touch sensor. The mesh pattern (including cuts 302 as appropriate) may serve as a template for manufacturing touch sensors, and lines of conductive material (e.g. metal) corresponding to mesh segments 206 of the Voronoi diagram may be formed on substrates according to the mesh pattern.

Although this disclosure describes and illustrates particular steps of the method of FIG. 4 as occurring in a particular order, this disclosure contemplates any suitable steps of the method of FIG. 4 occurring in any suitable order. Moreover, this disclosure contemplates any suitable combination of any suitable components carrying out any suitable steps of the method of FIG. 4.

Figure 5:
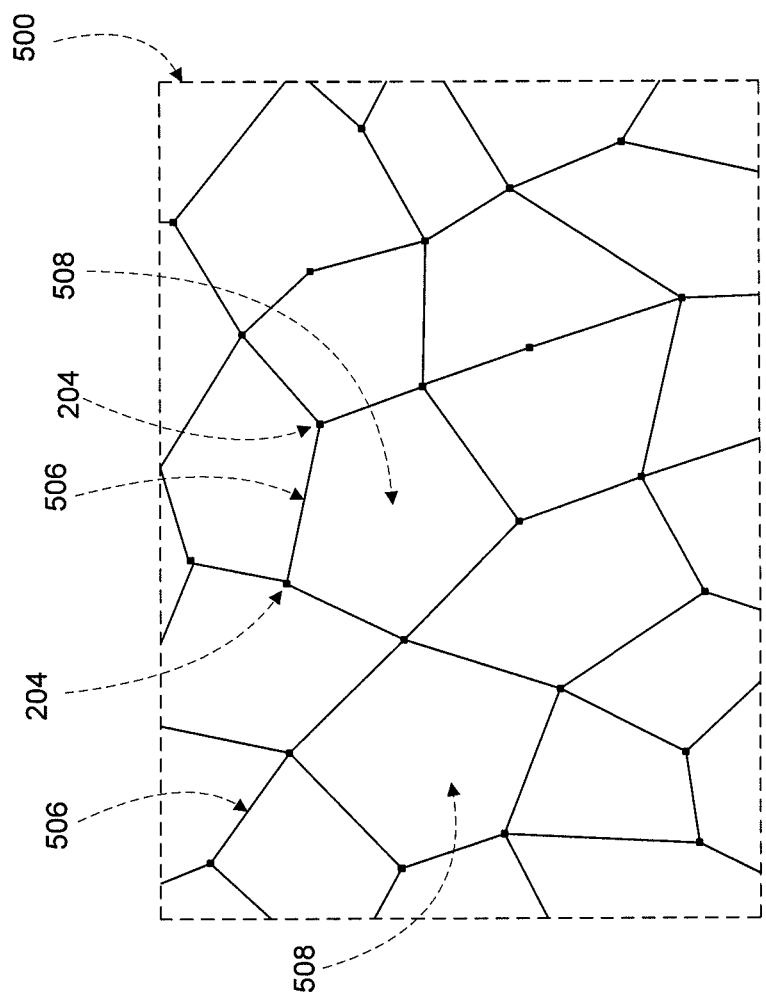
FIG. 5 illustrates another example of randomized micro-features of a touch sensor.

FIG. 5 illustrates another example of randomized micro-features of a touch sensor. In the example of FIG. 5, area 500 includes mesh segments 506 that define mesh cells 508 with vertices that correspond to seeds 204. Seeds 204 in area 500 of FIG. 5 are in the same locations as seeds 204 in area 200 of FIG. 2. Although this disclosure describes and illustrates a particular area 500 with particular seeds 204 in particular locations, this disclosure contemplates any suitable area 500 with any suitable seeds 204 in any suitable locations. Moreover, although this disclosure describes and illustrates particular mesh segments 506 defining particular mesh cells 508 in particular configurations, this disclosure contemplates any suitable mesh segments 506 defining any suitable mesh cells 508 in any suitable configurations.

Area 500 of FIG. 5 may correspond to a portion of a drive or sense electrode (or other element) of a touch sensor. Other portions of the drive or sense electrode or other element of the touch sensor—or other portions of other drive or sense electrodes or other elements of the touch sensor—may similarly embody substantially randomized mesh segments 506 similar to those shown in FIG. 5. In a touch sensor, mesh segments 506 may correspond to fine lines of metal (such as for example copper, silver, or a copper- or silver-based material) or other conductive material with a thickness of approximately 5 μm or less and a width of approximately 10 μm or less. Seeds 204 help determine the arrangement of mesh segments 506, as described below with reference to FIG. 6. Mesh segments 506 are arranged in a substantially randomized geometry that may reduce the occurrence of repeating patterns or frequencies among mesh segments 506, which may in turn reduce or eliminate the occurrence of moiré patterns with respect to a display visible through area 500.

Figure 6:
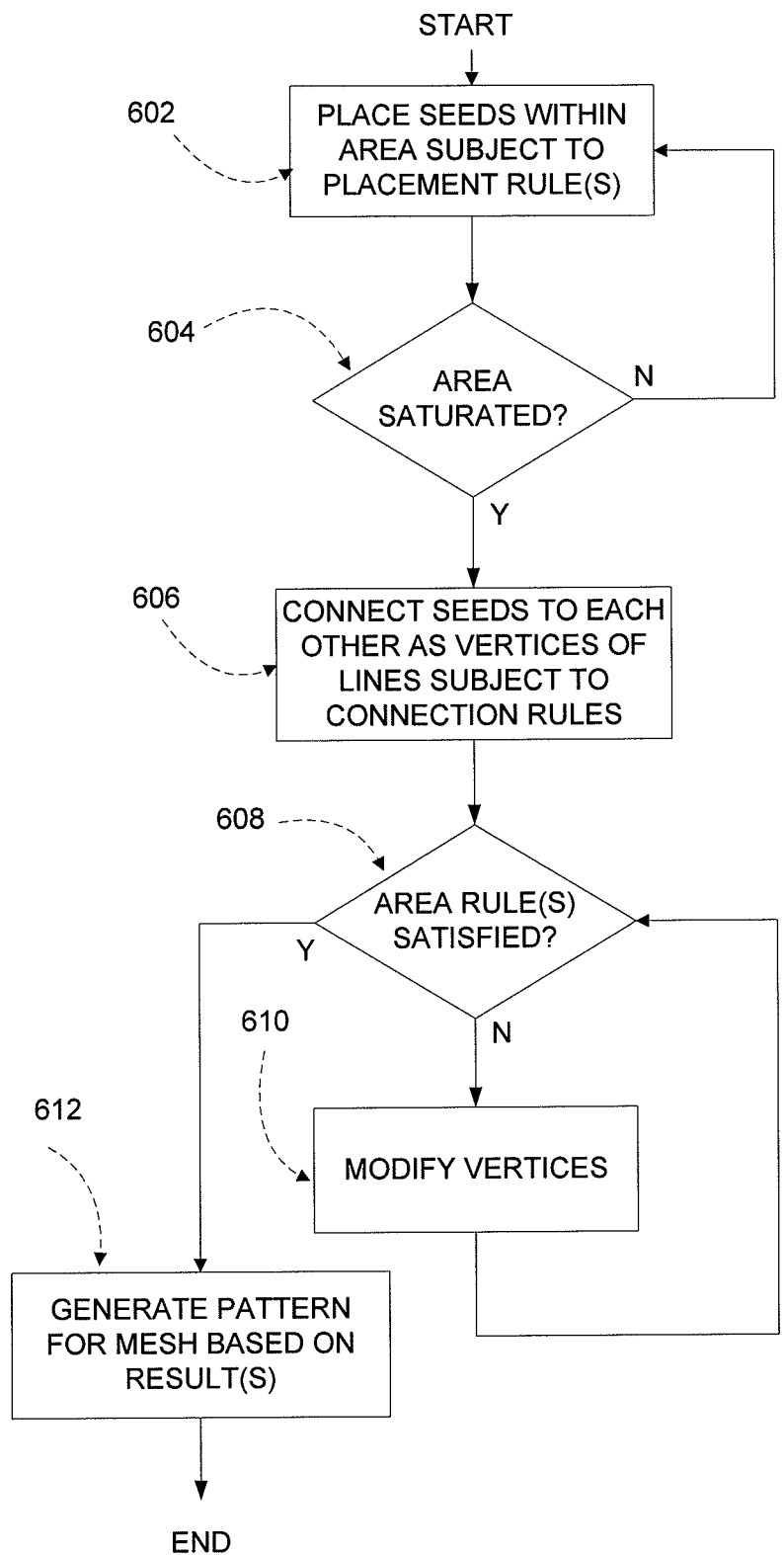
FIG. 6 illustrates another example method for randomizing one or more micro-features of a touch sensor.

FIG. 6 illustrates another example method for randomizing one or more micro-features of a touch sensor. The method begins at step 602, where seeds 204 are placed within an area subject to one or more placement rules. The area may be a physical area. In addition or as an alternative, the area may be a design area corresponding to an area of a template used to manufacture one or more portions of a touch sensor. In addition or as an alternative, the area may be a digital representation of an area. For each seed 204, a location is selected and, if placement of seed 204 at that location would satisfy all applicable placement rules, seed 204 may be placed at that location. If placement of seed 204 at that location would violate one or more applicable placement rules, a new location may be selected for seed 204. Seed 204 may be placed at the new location if placement of seed 204 at the new location would satisfy all applicable placement rules. If placement of seed 204 at the new location would violate one or more placement rules, another new location may be selected for seed 204. This process may continue until a suitable location is found for seed 204.

Locations for seeds 204 may be selected substantially randomly within the area. As an example and not by way of limitation, locations for seeds 204 may be selected at random from a group of locations making up the area. Each location within the area may be represented by an entry of a matrix, an entry of the matrix may be chosen substantially at random, and (if placement of a seed 204 there would satisfy all applicable placement rules) a seed 204 may be placed at a location corresponding to that entry of the matrix. If placement of seed 204 at that location would violate one more applicable placement rules, then another entry of the matrix may be chosen substantially at random and (if placement of seed 204 there would satisfy all applicable placement rules) seed 204 may placed at a location corresponding to the other entry of the matrix. If placement of seed 204 at the location corresponding to the other entry of the matrix would violate one or more applicable placement rules, then yet another matrix entry may be chosen substantially at random. This process may continue until a suitable location is found for seed 204.

A placement rule may be any suitable constraint on the placement of one or more seeds 204 within an area. As an example and not by way of limitation, a placement rule may specify that every seed 204 must be at least a minimum distance away from every other seed 204. Although this disclosure describes particular placement rules, this disclosure contemplates any suitable placement rules.

Seeds 204 may continue to be placed within the area until the area is saturated with them. As an example and not by way of limitation, the area may be considered saturated with seeds 204 if a pre-determined number of unsuccessful attempts have been made to place a seed 204 at step 602. In addition or as an alternative, the area may be considered saturated with seeds 204 if a methodical sweep of the area reveals that no further seeds 204 can be placed without violating placement rules. Although this disclosure describes particular forms of saturation, this disclosure contemplates any suitable forms of saturation. At step 604, if the area is saturated, then the method proceeds to step 606. Otherwise, the method returns to step 602.

At step 606, mesh segments 506 are placed within the area, connecting seeds 204 to each other subject to one or more connection rules. A connection rule may encompass any suitable constraint on connections between or among two or more seeds 204. As an example and not by way of limitation, a connection rule may specify that each seed 204 must have at least a pre-defined minimum number of mesh segments 506 connected to it. As another example, a connection rule may specify that no seed 204 may have more than a pre-defined maximum number of mesh segments 506 connected to it. As another example, a connection rule may specify that no seed 204 may have more than a pre-defined number of mesh segments 506 connected to it unless the total area enclosed by all mesh cells 508 that seed 204 corresponds to a vertex of exceeds a pre-defined threshold. As another example, a connection rule may specify that no mesh cell 508 may have fewer than a pre-defined minimum number (or more than a predefined maximum) of sides.

At step 608, if the mesh formed by the placement of mesh segments 506 violates one or more applicable area rules, then the method proceeds to step 610. If the mesh formed by the placement of mesh segments 506 satisfies all applicable area rules, then the method proceeds to step 612. An area rule may be any suitable constraint on the areas or other suitable aspects of mesh cells 508 formed by mesh segments 506. As an example and not by way of limitation, an area rule may specify that the area of each mesh cell 508 must be above a lower threshold and below an upper threshold. As another example, an area rule may specify that the range of areas (e.g. the area of a largest one of mesh cells 508 minus the area of a smallest one of mesh cells 508) must be below a threshold value. As another example, an area rule may specify that a length-to-width ratio of each mesh cell 508 must be within a range of pre-determined values. Although this disclosure describes particular area rules, this disclosure contemplates any suitable area rules.

At step 610, one or more vertices of one or more mesh cells 508 are modified. The vertices may be modified in any suitable manner. As an example and not by way of limitation, one or more vertices may be added, removed, or relocated. One or more mesh segments 506 may be added, removed, or relocated in response to one or more vertices being added, removed, or relocated. Modification of the vertices of the mesh cells 508 (and their mesh segments 506) may continue until all applicable area rules are satisfied.

At step 612, a mesh pattern is generated based on the mesh formed by the placement of mesh segments 506 (as modified where appropriate), at which point the method may end. This disclosure contemplates the mesh pattern being generated in any suitable manner. In particular embodiments, the mesh pattern generated based on the mesh formed by the placement of mesh segments 506 may encompass an interior portion of the mesh that excludes edge portions of the mesh. This may mitigate the effects of edge conditions of the mesh pattern that may result in one or more violations of one or more placement or area rules. Cuts 302 may be made to the mesh pattern to form various macro-features of a touch sensor. The mesh pattern (including cuts 302 as appropriate) may serve as a template for manufacturing touch sensors, and lines of conductive material (e.g. metal) corresponding to mesh segments 506 may be formed on substrates according to the mesh pattern.

Although this disclosure describes and illustrates particular steps of the method of FIG. 6 as occurring in a particular order, this disclosure contemplates any suitable steps of the method of FIG. 6 occurring in any suitable order. Moreover, this disclosure contemplates any suitable combination of any suitable components carrying out any suitable steps of the method of FIG. 6.

Figure 7:
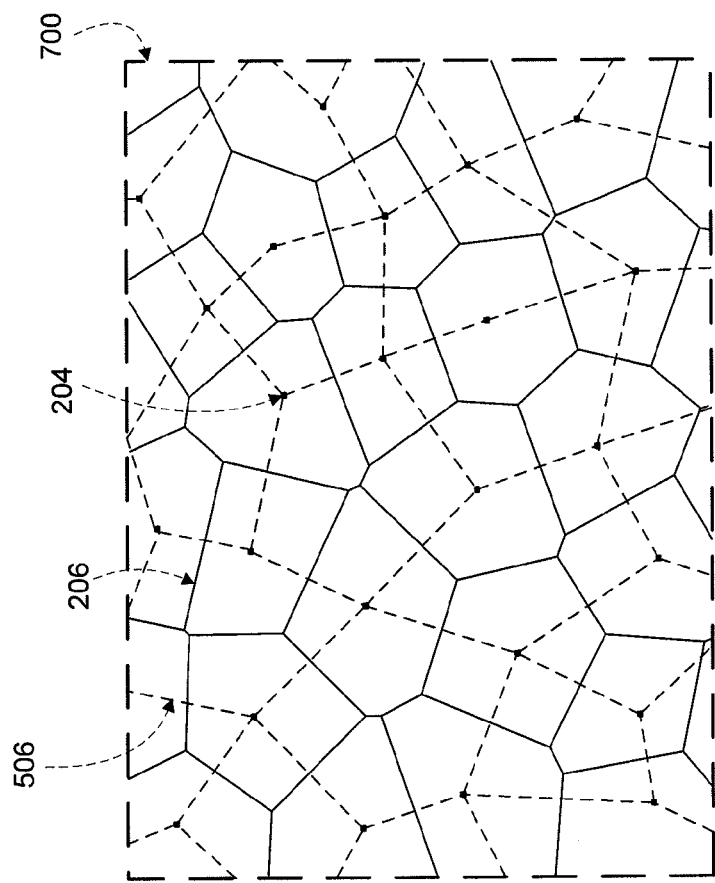
FIG. 7 illustrates an example combination of randomized micro-features similar to those of FIG. 2 and randomized micro-features similar to those of FIG. 5.

FIG. 7 illustrates an example combination of randomized micro-features similar to those of FIG. 2 and randomized micro-features similar to those of FIG. 5. In the example of FIG. 7, randomized micro-features similar to those of FIG. 2 (formed by mesh segments 206) provide one layer of conductive material for a touch sensor and randomized micro-features similar to those of FIG. 5 (formed by mesh segments 506) provide another layer of conductive material for the touch sensor. In FIG. 7, mesh segments 206 are shown as solid lines and mesh segments 506 are shown as dotted lines. However, both mesh segments 205 and mesh segments 506 may correspond to continuous fine lines of metal or other conductive material in a touch sensor.

Fine lines of metal or other conductive material may be disposed on one side of a substrate according to the mesh pattern formed by mesh segments 206, and fine lines of metal or other conductive material may be disposed on another side of the same substrate according to the mesh pattern formed by mesh segments 506. As an alternative, fine lines of metal or other conductive material may be disposed on one side of a substrate according to the mesh pattern formed by mesh segments 206, and fine lines of metal or other conductive material may be disposed on one side of another substrate according to the mesh pattern formed by mesh segments 506. Drive electrodes may be formed on the side or layer with fine lines of metal or other conductive material disposed according to the mesh pattern formed by mesh segments 206, and sense electrodes may be formed on the side or layer with fine lines of metal or other conductive material disposed according to the mesh pattern formed by mesh segments 506, or vice versa, where appropriate. Alone or in combination, the randomized micro-features similar to those of FIG. 2 and randomized micro-features similar to those of FIG. 5 may reduce or eliminate the occurrence of moiré patterns with respect to a display visible through area 700.

Figure 8:
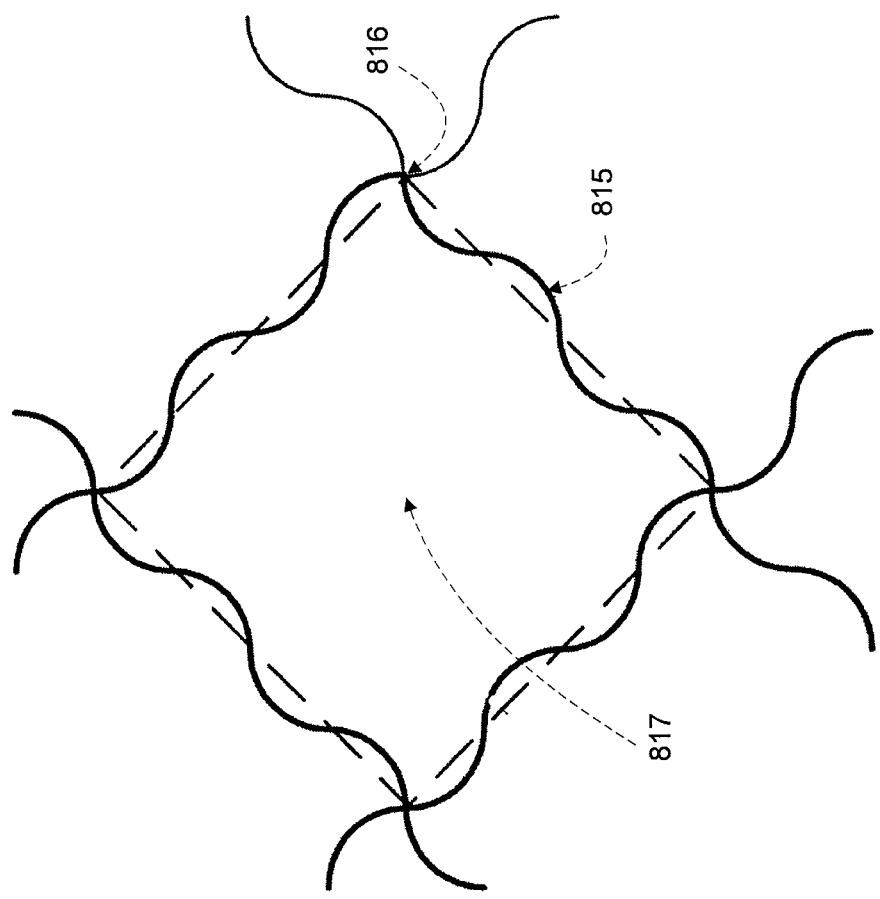
FIGS. 8-11 illustrate example sinusoidal shapes for example conductive lines in an example conductive mesh with randomized micro-features.

FIGS. 8-11 illustrate example sinusoidal shapes for example conductive lines in an example conductive mesh with randomized micro-features. In the example of FIG. 8, four conductive lines 815 define a mesh cell 817. Conductive lines 815 connect with each other at vertices 816. Although this disclosure describes and illustrates a particular mesh cell 817 having a substantially square shape, this disclosure contemplates any suitable mesh cells having any suitable shapes. As an example and not by way of limitation, mesh cells may have shapes substantially similar to those of mesh cells 206 in FIGS. 2-3 or those of mesh cells 506 in FIG. 5, generated according to the example methods of FIG. 4 or 6.

In the example of FIG. 8, conductive lines 815 extending between vertices 816 are not straight. Each conductive line 815 may have a sinusoidal shape. Each conductive line 815 may be arranged as a sinusoidal line on a path that would be taken by a straight line between vertices 816 linked by conductive line 815. Thus, comparing the examples of FIG. 2 and FIG. 8 with each other, each conductive line 815 in FIG. 8 may extend to either side of, one of mesh segments 206 in FIG. 2, shown as dotted lines in FIG. 8. Similarly, comparing the examples of FIG. 5 and FIG. 8 with each other, each conductive line 815 in FIG. 8 may extend to either side of, one of mesh segments 506 in FIG. 2, similarly shown as dotted lines in FIG. 8.

The sinusoidal shape of conductive lines 815 may reduce diffraction effects that would potentially be encountered if straight conductive lines were used. Such diffraction effects may result in the appearance of "starburst" patterns when a touch sensor is subject to bright ambient light. Such diffraction effects may result in color shifting, changing the apparent colors of LCD or other elements of a display visible through a touch sensor, and may obscure an image being displayed. The sinusoidal shape of conductive lines 815 may reduce the visibility of reflections from them when a touch sensor is illuminated by light from a point source, such as the sun on a clear day. The sinusoidal shape of conductive lines 815 may tend to distribute or disperse the apparent position on the touch sensor of such reflections and so may reduce the perceived visibility of repetitive reflection patterns. The human eye may readily perceive such repetitive reflection patterns.

Figure 9:
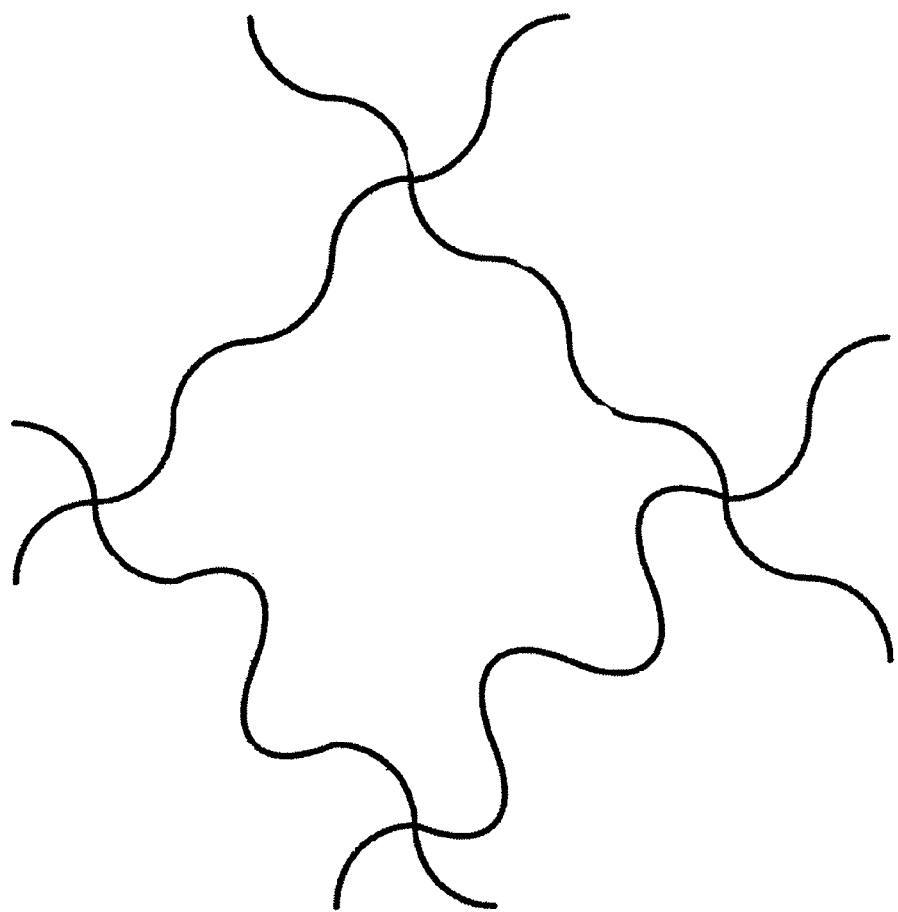
Figure 10:
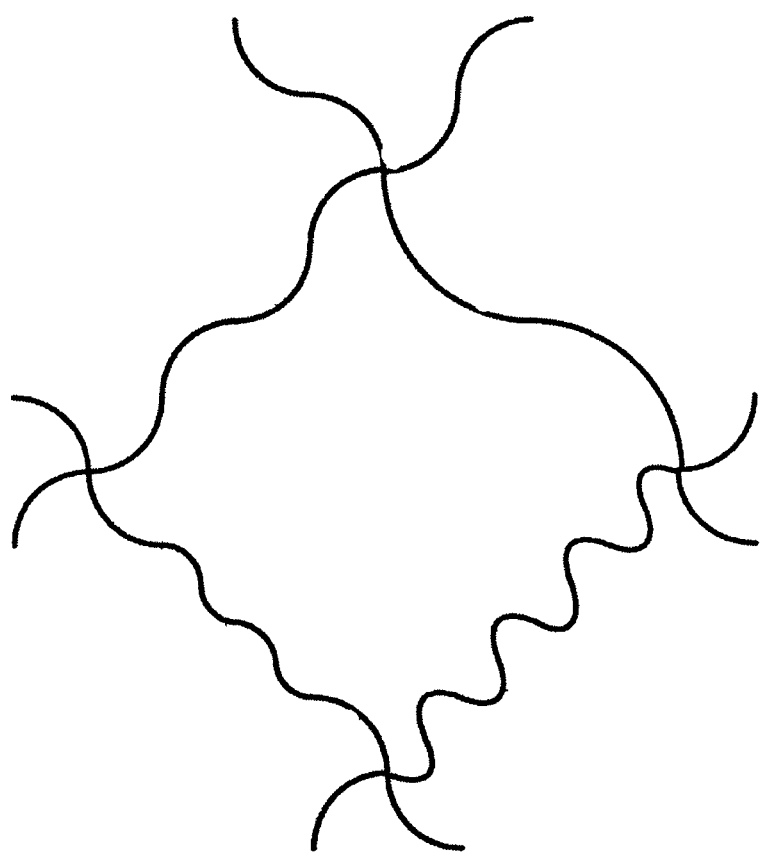
Figure 11:
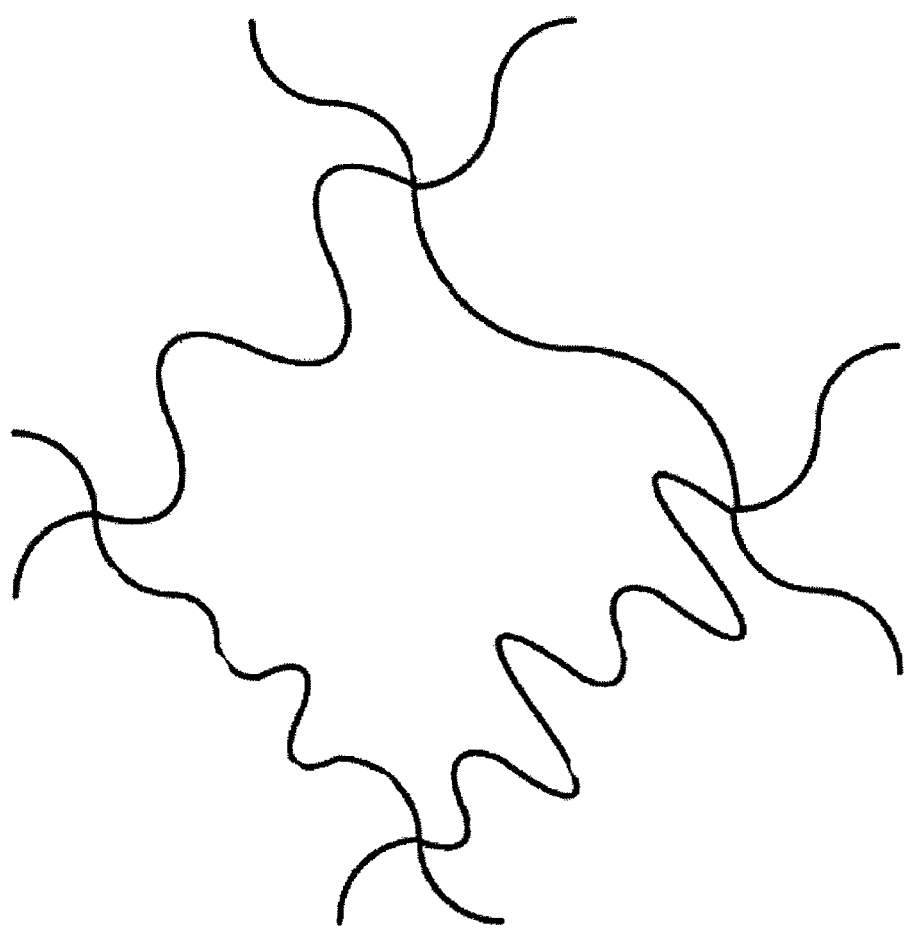

In the example of FIG. 8, each conductive line 815 makes two complete sinusoidal cycles between two vertices 816. However, this disclosure contemplates any suitable conductive line 815 making any suitable number of cycles between two vertices 816. In particular embodiments, conductive lines 815 may be formed as continuous curves. As an alternative, conductive lines 815 may be formed by a number of short straight-line sections arranged in a triangular waveform shape to approximate a sinusoidal shape. As another alternative, conductive lines 815 may be shaped as other types of curves. In particular embodiments, a conductive line 815 may be shaped as curves extending from a path that would be taken by a straight line between two vertices 816 linked by conductive line 815. In particular embodiments, the amplitudes, phases, or wavelengths of the sinusoidal shapes of conductive lines 815 need not be the same and may vary from one conductive line 815 to another. Moreover, where appropriate, the amplitudes, phases, or wavelengths of the sinusoidal shapes of different portions of a conductive line 815 need not the be same and may vary from one portion to another. FIGS. 9-11 illustrate examples of one or more of these concepts.

Although this disclosure describes and illustrates particular conductive lines 815 with particular non-linear shapes, this disclosure contemplates any suitable conductive lines with any suitable non-linear shapes (which need not necessarily be sinusoidal), where appropriate. These non-linear shapes may have substantially randomized frequencies, phases, amplitudes, or other suitable aspects, where appropriate.

In particular embodiments, the sinusoidal conductive lines may be configured to intersect with other conductive lines (e.g., sinusoidal or straight lines) at angles that are above a threshold value. In particular embodiments, the angle of intersection between conductive lines may be substantially 90 degrees. This may avoid visual effects that result from acute angles of intersection that may lead to high density in some areas.

In particular embodiments, sinusoidal conductive lines may be formed in a two layer configuration. In particular embodiments, a first layer comprising a mesh pattern with sinusoidal conductive lines is generated. A second layer comprising a different mesh pattern with sinusoidal conductive lines is also generated. If the overlaying of the first and second layers results in sinusoidal conductive lines that intersect at angles that are below a threshold value, one or more of the sinusoidal conductive lines of the mesh pattern of the second layer may be modified. For example, one or more phases of the one or more sinusoidal conductive lines of the mesh pattern of the second layer may be shifted to increase the angles of intersection.

Figure 12:
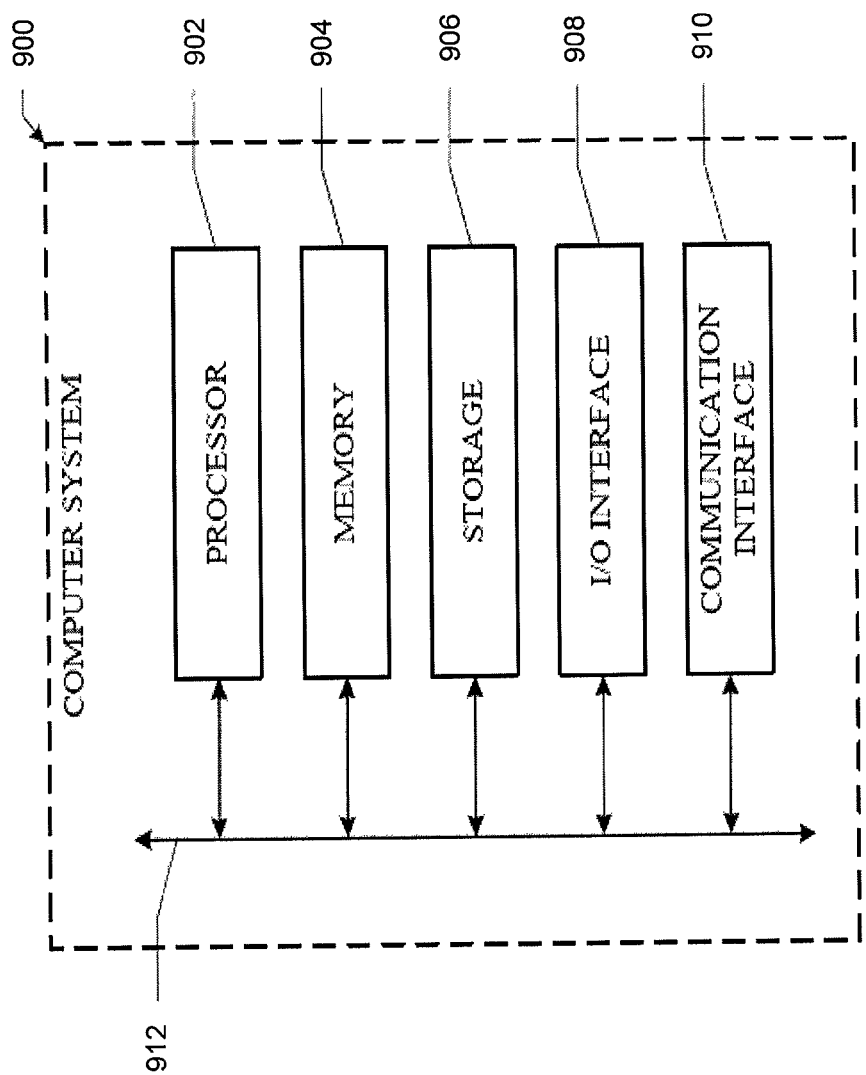
FIG. 12 illustrates an example computer system.

FIG. 12 illustrates an example computer system 900. In particular embodiments, one or more computer systems 900 perform one or more steps of one or more methods described or illustrated herein. As an example and not by way of limitation, one or more computer systems 900 may perform one or more steps of the methods of FIG. 4 or 6. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple datacenters; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program that may be stored in one or more computer-readable storage media. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example and not by way of limitation, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. An apparatus comprising:
  a touch sensor comprising one or more meshes of conductive material, each of the meshes comprising a plurality of mesh cells defined by a plurality of mesh segments, each of the mesh cells comprising a centroid and a plurality of vertices, the mesh segments being made of the conductive material, the centroids or vertices of the mesh cells having a substantially random distribution within an area of the touch sensor, wherein one or more of the meshes of conductive material substantially embody a Voronoi diagram, the mesh segments of the one or more meshes of conductive material corresponding to respective Voronoi segments positioned with respect to one or more Voronoi sites; and
  one or more computer-readable non-transitory storage media coupled to the touch sensor and embodying logic that is configured when executed to control the touch sensor.

2. The apparatus of claim 1, wherein the one or more meshes of conductive material comprise a first mesh and a second mesh, the first mesh being disposed on a first surface of a substrate and the second mesh being disposed on a second surface of the substrate opposite the first surface.

3. The apparatus of claim 2, wherein:
  in the first mesh, the centroids of the mesh cells have a substantially random distribution within the area of the touch sensor; and
  in the second mesh, the vertices of the mesh cells have a substantially random distribution within the area of the touch sensor.

4. The apparatus of claim 1, wherein the one or more meshes of conductive material comprise a first mesh and a second mesh, the first mesh being disposed on a surface of a first substrate and the second mesh being disposed on a surface of a second substrate.

5. The apparatus of claim 4, wherein:
  in the first mesh, the centroids of the mesh cells have a substantially random distribution within the area of the touch sensor; and
  in the second mesh, the vertices of the mesh cells have a substantially random distribution within the area of the touch sensor.

6. The apparatus of claim 1, wherein each of one or more of the mesh segments is a substantially straight line.

7. The apparatus of claim 1, wherein each of one or more of the mesh segments is substantially non-linear.

8. The apparatus of claim 7, wherein each of one or more of the mesh segments is substantially sinusoidal.

9. A touch sensor comprising:
  one or more meshes of conductive material;
  each of the meshes comprising a plurality of mesh cells defined by a plurality of mesh segments;
  each of the mesh cells comprising a centroid and a plurality of vertices;
  the mesh segments being made of the conductive material; and
    the centroids of the mesh cells having a substantially random distribution within an area of the touch sensor such that distances between the centroids vary, wherein one or more of the meshes of conductive material substantially embody a Voronoi diagram, the mesh segments of the one or more meshes of conductive material corresponding to a respective Voronoi segment positioned with respect to one or more Voronoi sites.

10. The touch sensor of claim 9, wherein the one or more meshes of conductive material comprise a first mesh and a second mesh, the first mesh being disposed on a first surface of a substrate and the second mesh being disposed on a second surface of the substrate opposite the first surface.

11. The touch sensor of claim 10, wherein:
in the first mesh, the centroids of the mesh cells have a substantially random distribution within the area of the touch sensor; and
in the second mesh, the vertices of the mesh cells have a substantially random distribution within the area of the touch sensor.

12. The touch sensor of claim 9, wherein the one or more meshes of conductive material comprise a first mesh and a second mesh, the first mesh being disposed on a surface of a first substrate and the second mesh being disposed on a surface of a second substrate.

13. The touch sensor of claim 12, wherein:
in the first mesh, the centroids of the mesh cells have a substantially random distribution within the area of the touch sensor; and
in the second mesh, the vertices of the mesh cells have a substantially random distribution within the area of the touch sensor.

14. A method comprising:
placing by one or more computer systems a plurality of seeds within an area subject to one or more placement rules and one or more area-saturation rules, the seeds having a substantially random distribution within the area as a result of the placement;
generating a pattern for a mesh of conductive material of a touch sensor at least in part by determining by one or more of the computer systems a plurality of mesh cells based on the placement of the seeds, the mesh cells being defined by a plurality of mesh segments, each of the mesh cells comprising a centroid and a plurality of vertices, the centroids or vertices of the mesh cells corresponding to the seeds, the pattern for the mesh of conductive material substantially embodying a Voronoi diagram, the seeds corresponding to Voronoi sites, the mesh segments corresponding to respective Voronoi segments.

15. The method of claim 14, wherein each of one or more of the mesh segments is a substantially straight line.

16. The method of claim 14, wherein each of one or more of the mesh segments is substantially non-linear.

17. The method of claim 16, wherein each of one or more of the mesh segments is substantially sinusoidal.

18. The method of claim 16, further comprising manufacturing the mesh of conductive material of the touch sensor.

* * * * *